(12) United States Patent
Wicks

(10) Patent No.: US 10,519,896 B2
(45) Date of Patent: Dec. 31, 2019

(54) SEMI-COMPLIANT COATING FOR THERMAL EXPANSION ABSORPTION

(71) Applicant: FORD GLOBAL TECHNOLOGIES, LLC, Dearborn, MI (US)

(72) Inventor: Christopher Donald Wicks, Allen Park, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 16/048,838

(22) Filed: Jul. 30, 2018

(65) Prior Publication Data

US 2018/0334991 A1 Nov. 22, 2018

Related U.S. Application Data

(63) Continuation-in-part of application No. 15/730,779, filed on Oct. 12, 2017, now Pat. No. 10,060,385.
(Continued)

(51) Int. Cl.
*F02F 1/36* (2006.01)
*F02F 1/42* (2006.01)
(Continued)

(52) U.S. Cl.
CPC .......... *F02F 1/4285* (2013.01); *B29C 43/003* (2013.01); *B29C 43/184* (2013.01); *B29C 45/0001* (2013.01); *B29C 45/0005* (2013.01); *B29C 45/14377* (2013.01); *F01L 1/3442* (2013.01); *F01L 3/04* (2013.01); *F02F 1/18* (2013.01); *F02F 1/36* (2013.01); *F02F 7/0085* (2013.01); *B29K 2101/10* (2013.01);
(Continued)

(58) Field of Classification Search
CPC .. F02F 1/4285; F01L 3/04; F01L 2001/34423
See application file for complete search history.

(56) References Cited

U.S. PATENT DOCUMENTS 4,852,542 A * 8/1989 Kamo ............... F02B 77/02
123/668
9,617,949 B2 4/2017 Baek et al.
(Continued)

FOREIGN PATENT DOCUMENTS

CN 105017957 A 11/2015
WO 2016056942 A1 4/2016

OTHER PUBLICATIONS

Gearhead Diva, How to Paint Your Engine Block, May 26, 2015, Gearhead Diva, https://web.archive.org/web/20151121063224/http://www.gearheaddiva.com/3711/how-to-paint-your-engine-block (Year: 2015).*

(Continued)

*Primary Examiner* — Kevin A Lathers
(74) *Attorney, Agent, or Firm* — Geoffrey Brumbaugh; Brooks Kushman P.C.

(57) ABSTRACT

An engine cylinder head includes an internal metal structure forming an upper portion of a combustion chamber. The internal metal structure includes a semi-compliant coating configured to absorb thermal expansion of the internal metal structure. The engine cylinder head also includes a polymer composite forming an external structure at least partially surrounding the internal metal structure.

18 Claims, 5 Drawing Sheets

Related U.S. Application Data which is a continuation-in-part of application No. 14/619,496, filed on Feb. 11, 2015, now Pat. No. 10,093,042.

(51) Int. Cl.

| | | |
|---|---|---|
| *F02F 1/18* | (2006.01) | |
| *F01L 3/04* | (2006.01) | |
| *F01L 1/344* | (2006.01) | |
| *B29C 45/14* | (2006.01) | |
| *B29C 45/00* | (2006.01) | |
| *B29C 43/18* | (2006.01) | |
| *B29C 43/00* | (2006.01) | |
| *F02F 7/00* | (2006.01) | |
| *B29L 31/00* | (2006.01) | |
| *F02F 1/24* | (2006.01) | |
| *B29K 101/10* | (2006.01) | |

(52) U.S. Cl.
CPC ............... *B29L 2031/748* (2013.01); *F01L 2001/34423* (2013.01); *F02F 2001/248* (2013.01); *F02F 2001/249* (2013.01); *F05C 2225/00* (2013.01)

(56) References Cited

U.S. PATENT DOCUMENTS

| | | | |
|---|---|---|---|
| 10,060,385 B2 * | 8/2018 | Wicks | F02F 1/24 |
| 2006/0150391 A1 | 7/2006 | Hetherington | |
| 2016/0084196 A1 | 3/2016 | Lee et al. | |
| 2016/0230696 A1 | 8/2016 | Williams et al. | |

OTHER PUBLICATIONS

Chinese Office Action dated Mar. 22, 2019 for CN Appn. No. 201610084813.2, 34 pgs.

* cited by examiner

SEMI-COMPLIANT COATING FOR THERMAL EXPANSION ABSORPTION

CROSS-REFERENCE TO RELATED APPLICATIONS

This application is a continuation-in-part of U.S. application Ser. No. 15/730,779, filed on Oct. 12, 2017, now U.S. Pat. No. 10,060,385 issued Aug. 28, 2018, which is a continuation-in-part of U.S. application Ser. No. 14/619,496, filed on Feb. 11, 2015, now U.S. Pat. No. 10,093,042 issued Oct. 9, 2018, the disclosures of which are hereby incorporated in their entirety by reference herein.

TECHNICAL FIELD

The present disclosure relates to components of an internal combustion engine, including a hybrid composite cylinder head having an internal metal structure and external polymer structure. More particularly, the present disclosure relates to a semi-compliant coating on the internal metal structure to absorb thermal expansion.

BACKGROUND

Cylinder heads are typically made of metal such as aluminum or cast iron. Metal cylinder heads may suffer from one or more disadvantages. The cast iron cylinder heads are heavy and exhibit low thermal conductivity. Aluminum cylinder heads are more expensive to make. Moreover, some aluminum cylinder heads may exhibit inadequate corrosion resistance and unacceptable thermal expansion for certain applications. Alternatives to metal cylinder heads have been proposed. For example, partially ceramic cylinder heads or fiber reinforced ceramic matrix composite cylinder heads have been proposed. However, such cylinder heads may exhibit limited thermal and peak pressure carrying capabilities, as well as delamination of over-molded composites due to varying thermal expansion rates between the metallic structure and composite material.

SUMMARY

According to one or more embodiments, an engine cylinder head includes an internal metal structure forming an upper portion of a combustion chamber. The internal metal structure includes a semi-compliant coating configured to absorb thermal expansion of the internal metal structure. The engine cylinder head further includes a polymer composite forming an external structure at least partially surrounding the internal metal structure.

According to at least one embodiment, the semi-compliant coating may be an elastomer or vulcanized material. In one or more embodiments, the semi-compliant coating may have a shore hardness of 60 to 80 Shore D. In some embodiments, the semi-compliant coating may be a rubber, latex, silicon, nylon, pebax, polyethylene terephthalate, polyurethane, fluorocarbon rubber, fluoropolymer, or a blend thereof. According to at least one embodiment, the semi-compliant coating may include metallic powders or particles to transfer heat from the internal metal structure to a cooling system of the engine cylinder head. In an embodiment, an entire outer surface of the internal metal structure contacting an inner surface of the external structure may include the semi-compliant coating. In certain embodiments, the semi-compliant coating may have a compliance of 1,100 to 1,500 psi. In one or more embodiments, the semi-compliant coating may have a thickness of up to 0.5 mm.

According to one or more embodiments, an engine cylinder head includes an internal metal structure defining an outer surface, a semi-compliant coating disposed on at least a portion of the outer surface and configured to absorb thermal expansion of the internal metal structure, and an external polymer composite structure at least partially surrounding the outer surface and defining an oil intake feed, an exhaust oil feed, a cam oil feed, or a cam bearing oil feed.

According to at least one embodiment, the semi-compliant coating may coat an entire surface of the outer surface of the internal metal structure. In one or more embodiments, the semi-compliant coating may be an elastomer or vulcanized material. According to one or more embodiments, the semi-compliant coating may have a shore hardness of 60 to 80 Shore D. In certain embodiments, the semi-compliant coating may have a thickness of up to 0.5 mm. In some embodiments, the semi-compliant coating may have a compliance of 1,100 to 1,500 psi.

According to one or more embodiments, an engine system includes an engine cylinder head including an internal metal structure defining an outer surface that includes a semi-compliant coating configured to absorb thermal expansion of the internal metal structure, and an external polymer composite structure over-molded onto the internal metal structure.

According to at least one embodiment, the semi-compliant coating may have a compliance of 1,100 to 1,500 psi. In an embodiment, the semi-compliant coating may have a thickness of up to 0.5 mm. In one or more embodiments, the semi-compliant coating may include metallic powders or particles to transfer heat from the internal metal structure to a cooling system of the engine cylinder head. According to at least one embodiment, the semi-compliant coating may can withstand up to 500° F. In one or more embodiments, the semi-compliant coating may be an elastomer or vulcanized material.

DETAILED DESCRIPTION

Figure 1:
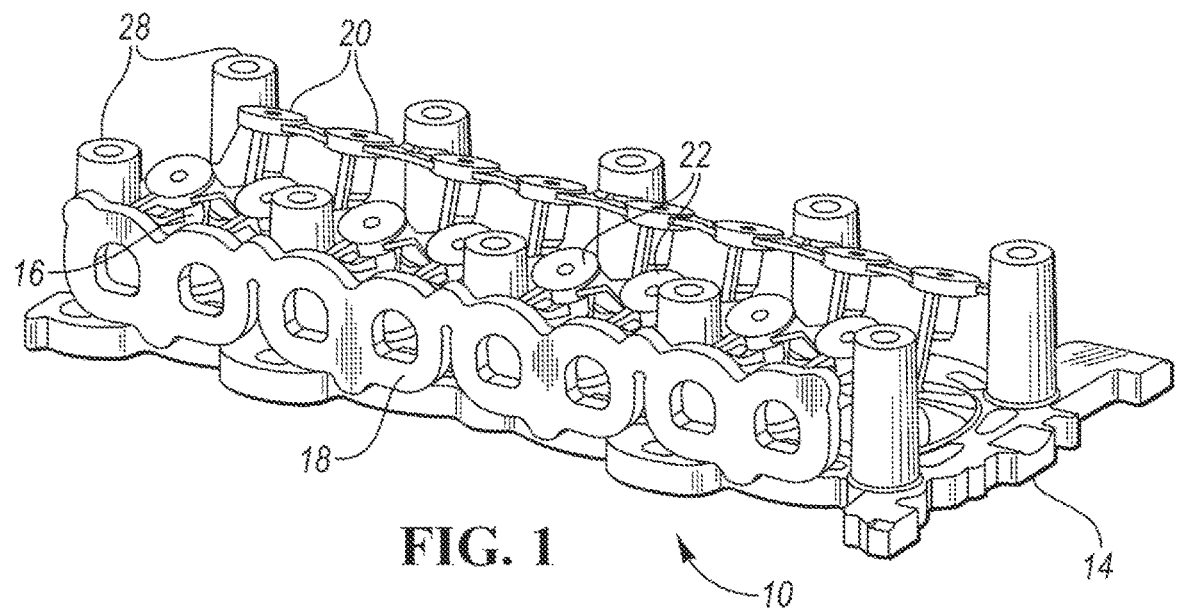
FIG. 1 depicts a perspective view of an internal metal structure of a hybrid composite cylinder head according to one or more embodiments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

An internal combustion engine includes an engine with one or more cylinders. Each of the cylinders is covered with an engine cylinder head which sits above each cylinder and on top of a cylinder block. The cylinder head closes at the top of the cylinder and thus forms a combustion chamber. In addition, the cylinder head provides space for the passages that feed air and fuel to the cylinder and allow exhaust to escape. The cylinder head may also be a suitable location to mount spark plugs, valves, and fuel injectors.

Cylinder heads are typically made from metal such as aluminum or cast iron. Potential disadvantages of cylinder heads made completely from cast iron include relatively high weight and low thermal conductivity. Aluminum cylinder heads are typically half the weight of an equivalent cast iron cylinder heads and about three times better in terms of thermal conductivity. However, aluminum cylinder heads may be too expense, provide insufficient corrosion resistance, may be too soft for certain applications, and may exhibit high thermal expansion. An alternative to the metal cylinder heads is a cylinder head partially formed from a ceramic material. For example, U.S. Pat. No. 5,657,729 discloses a metal heat sink coupled to an upper portion of the ceramic section within a combustion chamber. Additionally, U.S. Pat. No. 5,657,729 discloses a fiber reinforced ceramic matrix composite cylinder head and cylinder head liner. However, such composite cylinder heads have a limited thermal and peak pressure carrying capabilities. Additionally, ceramic materials cannot be molded around a metal skeleton of the cylinder head. Furthermore, U.S. patent application Ser. No. 15/730,779 discloses a cylinder head with a thermal coating to maintain heat where desired, which is incorporated by reference in its entirety.

Therefore, there remains a need to develop a cylinder head which would absorb the thermal expansion of the materials during over-molding. It is also desirable to provide a cylinder head which would have other advantages such as good corrosion resistance, thermal benefits, maintained rigidity, and/or reduced number of machine operations during production of the cylinder head.

A hybrid composite cylinder head as disclosed herein solves one or more problems described above and/or provides the benefits identified above. The hybrid composite cylinder head as disclosed herein is suitable for use in a variety of engines. For example, the hybrid composite cylinder head may be used in a gasoline direct injection engine and/or gasoline/diesel port fuel injection engine.

According to one or more embodiments, the hybrid composite cylinder head is capable of withstanding temperatures of 150° C. or less, 100° C. or less, 50° C. or less, 0° C. or less, −20° C. or less, −40° C. or less, −60° C. or less, or −80° C. or less. The hybrid composite cylinder head is capable of withstanding temperatures of 90° C. or more, 110° C. or more, 150° C. or more, 200° C. or more, 250° C. or more, 300° C. or more, or 350° C. or more. The hybrid composite cylinder head is capable of withstanding a coolant pressure of 0.5 bar or more, 0.75 bar or more, 1 bar or more, or 1.5 bar or more. The hybrid composite cylinder head is capable of withstanding a cylinder pressure of 50 bar or more, 75 bar or more, 100 bar or more, 125 bar or more, or 150 bar or more.

According to one or more embodiments, as shown in FIGS. 1-5, the hybrid composite cylinder head 100 includes an internal metal structure 10 and a composite material external structure 12. The hybrid composite cylinder head 100 has a relatively low weight compared to a metal cylinder head. The hybrid component cylinder head 100 offers additional advantages. For example, a combination of the internal metal structure 10 and the external polymer composite structure 12 allows for better organization of the complicated internal shape of the cylinder head 100. For instance, a coolant circuit of a composite cylinder head 100 is better organized in comparison to traditional metal cylinder heads. The hybrid composite cylinder head 100 allows for optimized heat transfer so that the heat is retained where it is desirable.

Figure 2:
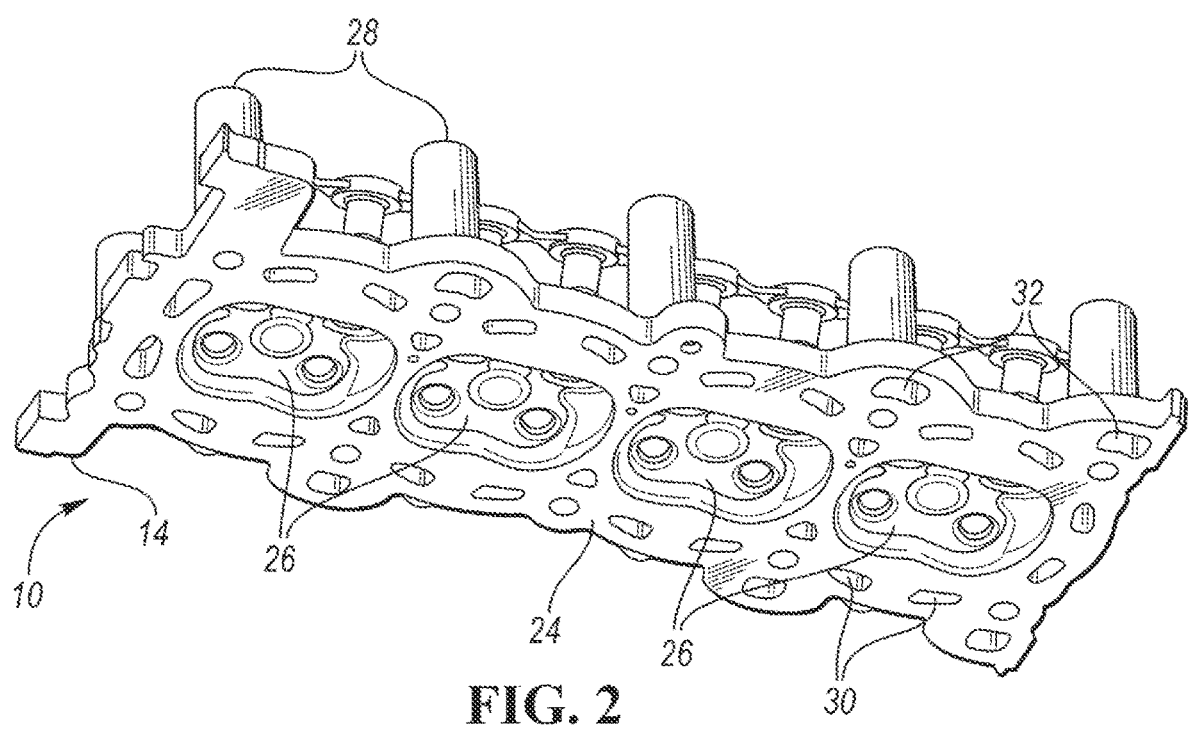
FIG. 2 depicts an alternative view of the internal metal structure shown in FIG. 1.

Referring to FIGS. 1 and 2, the internal metal structure 10 may be a section forming an upper portion of a combustion chamber. The internal metal structure 10 may include a combustion chamber insert 14. As illustrated in FIGS. 1 and 2, the internal metal structure 10 may contain the following components of the cylinder head: one or more valve stem guides 16, an exhaust face 18, one or more intake valve spring seats 20, one or more exhaust valve spring seats 22, a fire deck 24, one or more domes of one or more combustion chambers 26, one or more head bolt columns 28, or a combination thereof. The fire (head) deck 24 may include one or more intake and/or exhaust ports, which are passages cast into the internal metal structure 10 of the cylinder head 100 leading from manifolds to respective valves. As can be seen in FIG. 2, the fire deck 24 may include a plurality of engine coolant ports 30 and a plurality of oil drain ports and crankcase vents 32.

It is contemplated that at least some of the above-mentioned components could be included in the external polymer composite structure 12 instead of the internal metal structure 10. However, it is desirable to provide at least some of the parts, such as the fire deck 24 and the exhaust face 18, as part of the internal metal structure 10 because the fire deck 24 and the exhaust face 18 may be exposed to temperatures and pressure higher than the composite material may withstand. Additionally, the inclusion of one or more of the above-mentioned components in the internal metal structure 10 allows for reduction or prevention of fatigue failure of the cylinder head due to exposure to alternating stresses.

The internal metal structure 10 is capable of carrying a static and dynamic load while the external polymer composite structure 12 is not required to carry a static load. The head bolt columns 28 mitigate a static load imparted by the metal material. Further still, forming one or more of the above-mentioned components from metal has further advantages. For example, the fire deck 24 adds structural stiffness, structural flatness, and sealability to the internal metal structure 10, as well as maintains the dimensional stability of one or more domes of the combustion chambers 26.

The internal metal structure 10 may be made from aluminum, texturized aluminum, cast iron, CGI iron, steel, or another metal, depending on the specific engine application. The internal metal structure 10 may be made from one or more alloys. For example, the internal metal structure 10 may be made from an aluminum alloy comprising copper, silicon, manganese, magnesium, the like, or a combination thereof. An addition of silicon and/or copper reduces thermal expansion and contraction, durability, and castability of the internal metal structure 10. An addition of copper promotes age-hardening. An addition of manganese and/or magnesium improves strength of the alloy. Because the internal metal structure 10 forms a portion of a combustion chamber 14, the material of the internal metal structure 10 is capable of withstanding an increase in temperature and pressure during the combustion process. The type of material used for the internal metal structure 10 may be adjusted depending on the needs of a specific application such as required performance, peak pressure, duty cycle, the like, or a combination thereof.

Figure 3:
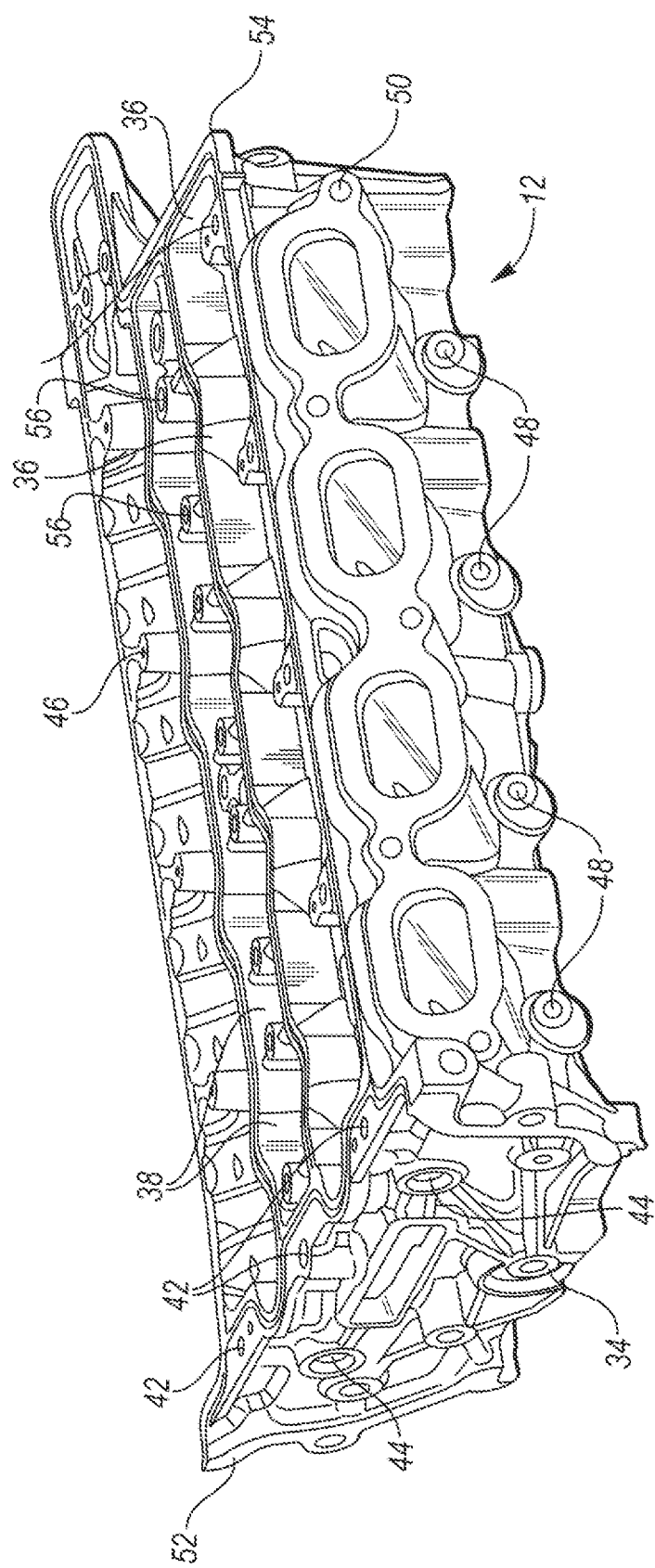
FIG. 3 depicts a perspective view of a composite external structure of a hybrid composite cylinder head in accordance with one or more embodiments.

Referring to FIG. 3, the external polymer composite structure 12 of cylinder head 100 is shown. The external polymer composite structure 12 may include a plurality of components. In one or more non-limiting embodiments, the external polymer composite structure 12 may include one or more water jacket core supports 34, one or more intake valve spring pockets 36, one or more spark plug and direct injection pockets 38, one or more fuel pump pedestal pockets 40, one or more oil feeds to the cam 42, one or more intake and exhaust oil feeds 44 for a hydraulic lash adjuster, cam bearing oil feeds 46, one or more side direct injection mounting ports 48, one or more intake mounting bosses 50, a front cover seal rail 52, a cam carrier mounting rail 54, and/or one or more cam carrier mounting bosses 56. It is contemplated that other parts of a cylinder head may be a part of the external polymer composite structure 12. For example, intake manifolds or a base head (not depicted) could be included in the external polymer composite structure 12.

The external polymer composite structure 12 may be formed from a composite material and at least partially surround the internal metal structure 10 of the cylinder head. The external polymer composite structure 12 may include reinforced polymer material. The external polymer composite structure 12 may include a thermoplastic material. The external polymer composite structure 12 may include a thermoset resin. The thermoset resin may include a polyester resin, an epoxy resin, a phenolic resin, a polyurethane, a polyimide, a silicone, or other type of resins, and combination thereof. The external polymer composite structure 12 may be reinforced with a fibrous material. The external polymer composite structure 12 may include fiber-reinforced polymers. For example, the external polymer composite structure 12 may be reinforced with carbon fiber, aramid fiber, glass, basalt, the like, or a combination thereof. The external polymer composite structure 12 may be reinforced with lignocellulosic fibers such as cotton, wool, flax, jute, coconut, hemp, straw, grass fiber, and other fibers available directly from natural sources, as well as chemically modified natural fibers, for example chemically modified cellulose fibers, cotton fibers, etc. Suitable natural fibers also include abaca, cantala, caroa, henequen, istle, Mauritius, phormium, bowstring, sisal, kenaf, ramie, roselle, sunn, cadillo, kapok, broom root, coir, crin vegetal, and piassaua. These lists of natural fibers are illustrative and not limiting. Examples of chemically modified fibers also include azlon (regenerated natural proteins), regenerated cellulose products including cellulose xanthate (rayon), cellulose acetate, cellulose triacetate, cellulose nitrate, alginate fibers, casein-based fibers, and the like.

In one or more embodiments, the external polymer composite structure 12 includes a thermoset resin reinforced with carbon fibers to increase stiffness, provide the desired weight reduction, excellent fatigue resistance, and chemical resistance. Carbon fibers are also suitable due to their high strength-to-weight and stiffness-to-weight ratio. However, any type of fiber is suitable and a specific composition of the composite material depends on a particular engine application.

In one or more embodiments, the method of making the composite cylinder head 100 includes the following steps. While the described method refers to the cylinder head 100, the process is likewise applicable to the hybrid cylinder head 200 as well as its individual portions. The internal metal structure 10 may be manufactured as one unit, for example by additive manufacturing, casting, monocasting, molding, welding, or forming by another method. Alternatively, individual portions of the hybrid composite cylinder head 100 may be produced separately and the internal metal structure 10 may be assembled from the individual portions. Preferably, the individual portions of the cylinder head 100 are molded together to form a uniform combustion chamber insert 14. For example, producing the fire deck 24 by monocasting or molding together with one or more additional portions as part of the combustion chamber insert 14 offers improved rigidity, strength, and flatness control. Once the internal metal structure 10 is cast or otherwise produced, it is desirable to at least partially machine the internal metal structure 10. For example, the internal metal structure 10 may be machined to create one or more locators or other features which help to hold the internal metal structure 10 in place during thermosetting.

Figure 4:
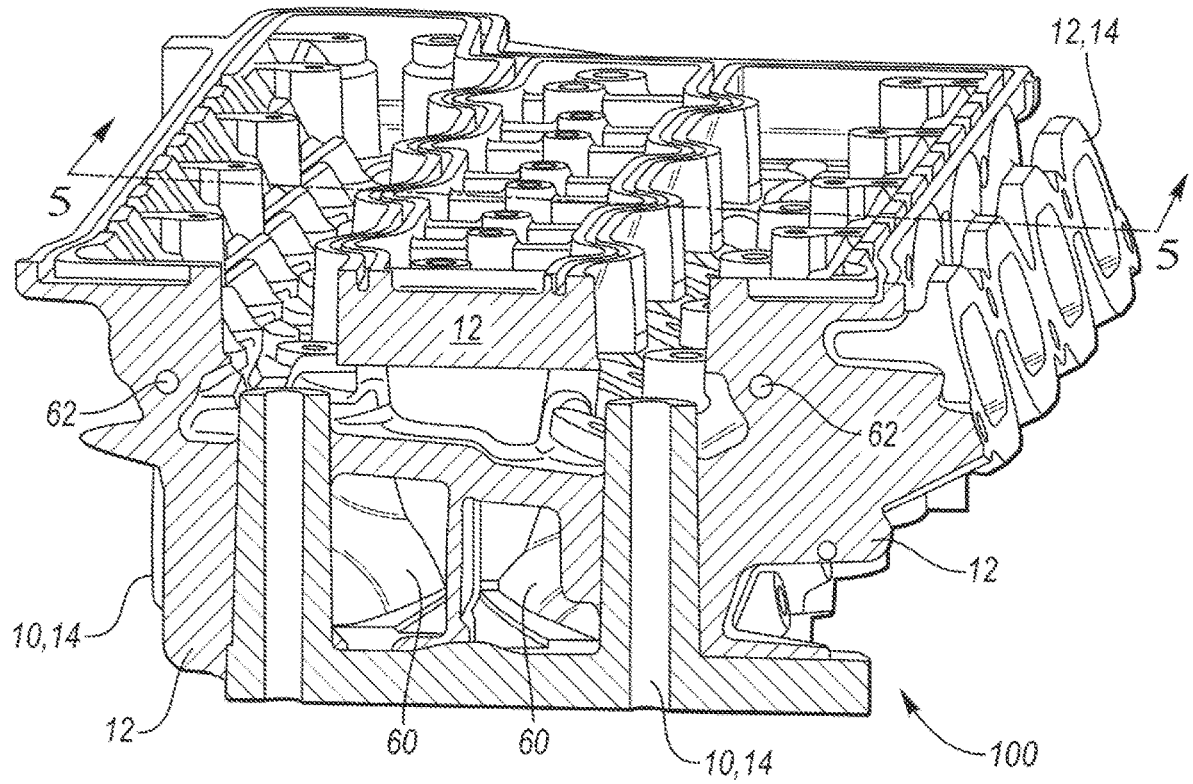
FIG. 4 depicts a perspective front cross-sectional view of an assembled hybrid composite cylinder head including the internal metal structure of FIG. 1 and the composite exterior structure of FIG. 3.
Figure 5:
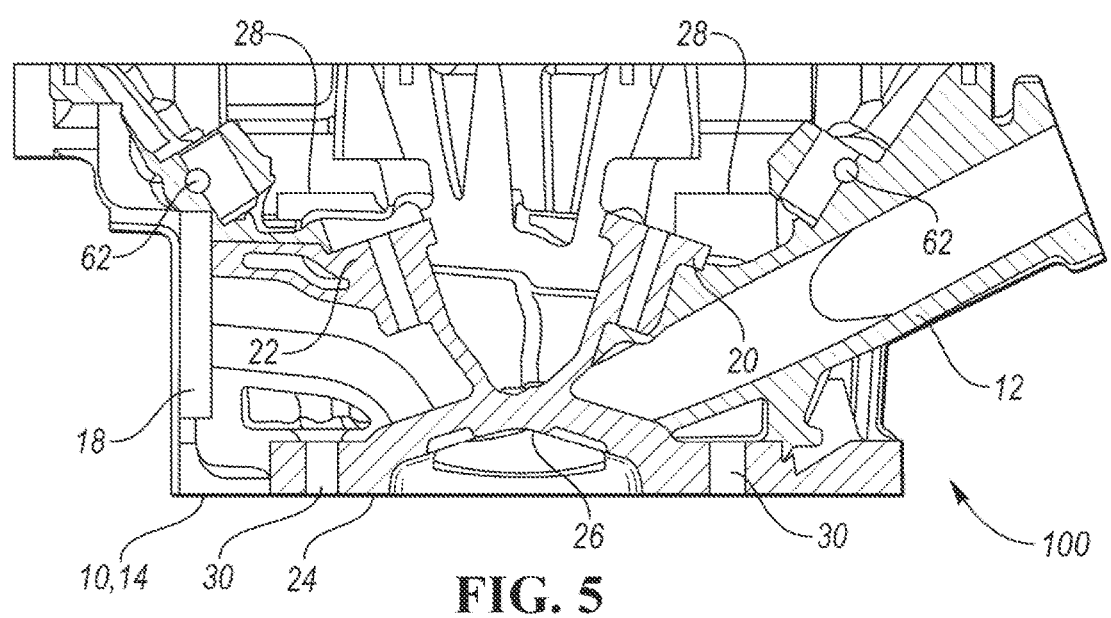
FIG. 5 shows a perspective cross sectional view taken along line 5-5 of FIG. 4.

In at least one embodiment, as illustrated in FIGS. 4 and 5, the resulting combustion chamber insert 14 is molded into the external composite polymer structure 12. The temperature is subsequently lowered, the dye opened, the hybrid composite cylinder head 100 taken out and set at room temperature. FIG. 4 illustrates the internal metal structure 10 and the external polymer composite structure 12 assembled in such a way as to create a water-tight seam to seal the cylinder head water jackets 60 within the cylinder head 100 assembly. As can be seen in FIG. 4, the water jackets 60 are molded as part of the external polymer composite structure 12. FIG. 5 illustrates a cross section along the line 5-5 of FIG. 4. As can be seen in FIGS. 4 and 5, the internal metal structure 10 is at least partially surrounded by the external polymer composite structure 12. FIG. 5 shows the following parts of the internal metal structure 10: a combustion chamber 26, two head bolt columns 28, the exhaust face 18, one intake valve spring seat 20, one exhaust valve spring seat 22, and two engine coolant ports 30 molded as part of the external polymer composite structure 12. The openings 62 in the composite material house an oil circuit.

A machine to produce a hybrid composite cylinder head 100 may be a machine including a cast or a mold for production of the internal metal structure 10 according to the method described above. An additional machine includes a mold machine for injection molding, compression molding, spin casting, or another molding technique for molding the composite material at least partially over the internal metal structure 10 according to the method describe above.

In at least one embodiment, the internal metal structure 10 is inserted in the dye of the molding machine. The internal metal structure 10 is tempered. The dye is closed. The composite material of the external polymer composite structure 12 is supplied into the dye. The external polymer composite structure 12 is formed by molding during which the composite material cures. The composite material is being molded over the internal metal structure 10 placed in the dye. The composite material may be molded by injection molding, compression molding, spin casting, or another molding method. The cure may be induced by heat of about 200° C. or more, by a chemical reaction, irradiation, or a combination thereof. The curing process transforms the thermosetting plastic to a hardened thermoset resin which has taken its final shape due to a cross-linking process. One or more catalysts and/or energy can be added during the reaction to cause the molecular chains to react at chemically active sites and link into a rigid 3-D structure which cannot be reheated to change its shape. After curing, the external composite polymer structure 12 is well suited for high-temperature applications.

During over-molding of the hybrid composite cylinder head 100, the internal metal structure 10 typically expands and shrinks faster than the external polymer composite structure 12 due to different thermal expansion rates of the materials. Therefore, the internal metal structure 10 could disengage from the external polymer composite structure 12 during use of the cylinder head 100. To reduce the risk of delamination, a semi-compliant coating 64 may be provided on the internal metal structure 10 of the hybrid composite cylinder head 100. The semi-compliant coating 64 is capable of deforming or otherwise compressing to relieve or reduce the pressure imposed in response to the thermal expansion or contraction of the internal metal structure, thus accommodating the change in size of the internal metal structure during over-molding and operation to reduce risk of delamination of the external polymer composite structure.

Figure 6:
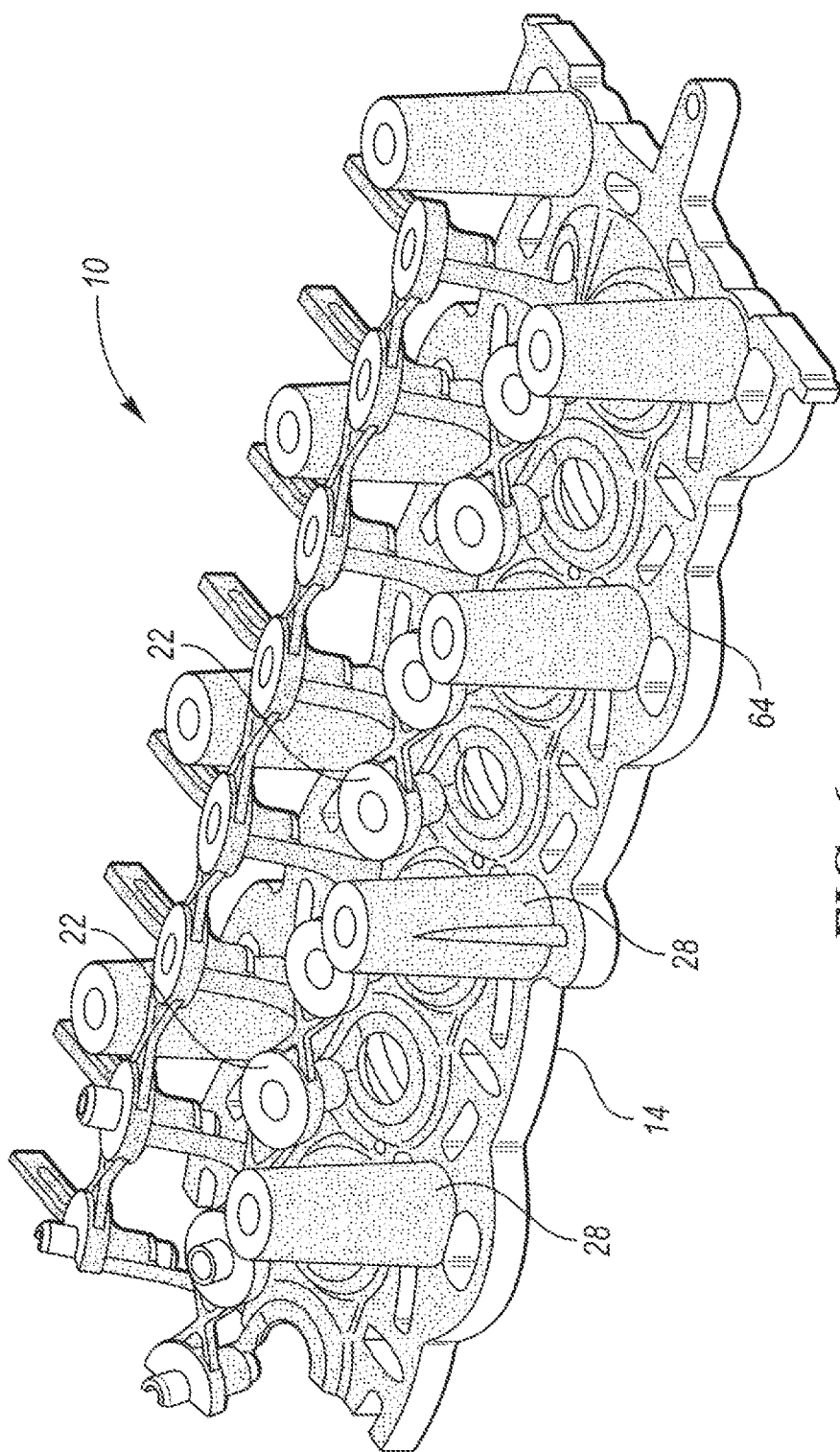
FIG. 6 shows a perspective view of an internal metal structure of a hybrid composite cylinder head with a semi-compliant coating, according to one or more embodiments.

FIG. 6 illustrates the internal metal structure 10 of the hybrid composite cylinder head 100 with semi-compliant coating 64. The coating may be applied to a portion of, or the entire outer surface of the internal metal structure 10, prior to the over-molding process. The semi-compliant coating 64 absorbs unwanted movement caused by different thermal expansion rates between the different materials in the hybrid composite cylinder head 100 during over-molding and normal engine operation. Although semi-compliant coating 64 is shown on the entire outer surface of the internal metal structure 10 for illustrative purposes, any portion of the surface being over-molded may include the semi-compliant coating 64 to absorb movement caused by different thermal expansion rates of the materials. In certain embodiments, the semi-compliant coating 64 is located where delamination risk is high. As such, the semi-compliant coating 64 may be located where the inner surface of the external polymer composite structure contacts the outer surface of the internal metal structure 10.

The semi-compliant coating 64 is an elastic material capable of absorbing thermal expansion of the internal metal structure, external polymer composite structure, or both. The semi-compliant coating 64 may be an elastomer or a vulcanized material. Example materials for the semi-compliant coating 64 include, but are not limited to, rubber, silicone, latex, nylon, neoprene, polyurethane, pebax, polyethylene terephthalate, fluorocarbon rubbers, fluoropolymers, or blends thereof. In at least one embodiment, the semi-compliant coating 64 includes metallic powders or particles which aid heat transfer to the cylinder head cooling system. The semi-compliant coating 64 may be up to 0.5 mm thick on the internal metal structure. For example, the thickness of the semi-compliant coating 64 may be 0.05 to to 0.5 mm, 0.1 to 0.45 mm, or 0.15 to 0.4 mm.

The semi-compliant coating 64 is more flexible than a rigid non-compliant coating, evidenced by a higher compliance than a non-compliant coating material. Compliance is defined as the tolerance of a material to undergo elastic deformation due to a unit load, and is the reciprocal of stiffness (i.e., the reciprocal of resistance to deformation in response to application of force). Thus, a semi-compliant material has more deformation tolerance than a non-compliant material. In at least one embodiment, the semi-compliant coating has a compliance of 1,100 to 1,500 psi. In another embodiment, the semi-compliant coating has a compliance of 1,200 to 1,400 psi, and yet another embodiment, 1,250 to 1,300 psi. In at least another embodiment, the semi-compliant coating has a shore hardness of 60 to 80 Shore D, as measured by a durometer (ASTM D2240). In other embodiments, the semi-compliant coating has a shore hardness of 65 to 75 Shore D, and in yet another embodiment, a shore hardness of 68 to 72 Shore D. In an embodiment, the semi-compliant coating has a shore hardness of 70 Shore D. According to one or more embodiments, the semi-compliant coating 64 is capable of withstanding temperatures of up to 500° F. In other embodiments, the semi-compliant coating 64 is capable of withstanding temperatures of up to 480° F.

The semi-compliant coating 64 may be continuous or discontinuous on a portion of the internal metal structure 10. For example, the semi-compliant coating 64 may be in a striped pattern such that some parts of the surface of the internal metal structure 10 is coated, e.g. areas with high delamination risk, and other parts are not coated. The semi-compliant coating 64 conforms to the shape of the surface of the internal metal structure 10. The thickness of the semi-compliant coating 64 may be uniform or differ on different portions of the internal metal structure 10. The semi-compliant coating 64 may be smooth or at least a portion of the semi-compliant coating 64 may be textured such as include ridges, valleys, peaks, protrusions, spikes, or the like. In at least one embodiment, about 5, 10, 15, 20, 25, 30, 35, 40, 45, 50, 55, 60, 65, 70, 75, 80, 90, 95, or more % of the outer surface of the internal metal structure 10 may be coated with the semi-compliant coating 64. In an embodiment, the entire outer surface of the internal metal structure 10 is coated with the semi-compliant coating 64.

The semi-compliant coating 64 of the same composition may be used on different portions of the internal metal structure 10. Alternatively, two or more coatings 64 of different compositions may be implemented such that for example, a first coating's composition differs from a composition of a second coating. Besides composition, the first and second coating may differ in dimensions such as thickness, (dis)continuity, or the like. The first semi-compliant coating 64' and the second semi-compliant coating 64" may be temporarily or permanently in contact with each other. Additional coatings such as a third, fourth, etc. coatings are contemplated.

In certain embodiments, it is desirable to increase surface area of at least some areas of the internal metal structure 10. The surface area may be increased by adding texture to at least some areas of the internal metal structure 10. This can be done by a variety of methods, for example by roughening, serrating, micro-serrating, abrasive cutting, blasting, honing, electrical discharge machining, milling, etching, chemical milling, laser texturing, or by another process, or a combination thereof. At least in one embodiment, texture is added to the surface of the head bolt columns 24, which improves bond strength between the internal metal structure 10 and the composite material of the external polymer composite structure 12. The step of adding texture to a surface of the internal metal structure should be performed before the internal metal structure 10 is inserted into a dye and before the internal metal structure 10 is over-molded by the composite material.

Furthermore, it is contemplated that the internal metal structure 10 may be subjected to additional treatment. In one or more embodiments, a coating ensuring better thermal management may be applied to one or more surfaces of the internal metal structure 10 of the hybrid composite cylinder head 100 which is exposed to hot gasses. The coating may be applied selectively such that only one or more portions of the internal metal structure are coated. Coating may be provided by painting, spraying, printing, dip coating, or a combination thereof. A mask may be used to ensure precise application of the coating to a certain portion of the internal metal structure. The coating may be provided on top of the semi-compliant coating 64, on outer surface portions not covered by semi-compliant coating 64, or on inner surfaces of the internal metal structure 10.

Figure 7:
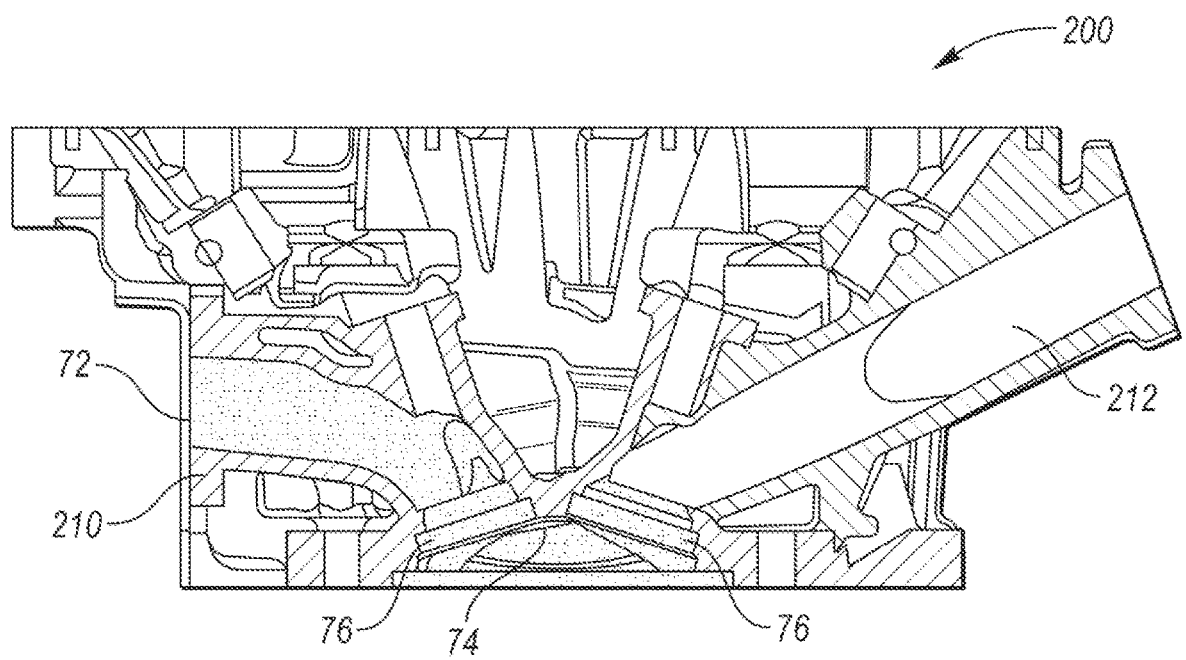
FIG. 7 shows a cross sectional view taken along line 5-5 of FIG. 4 of an alternative embodiment, depicting a thermal coating on portions of the internal metal structure.
Figure 8:
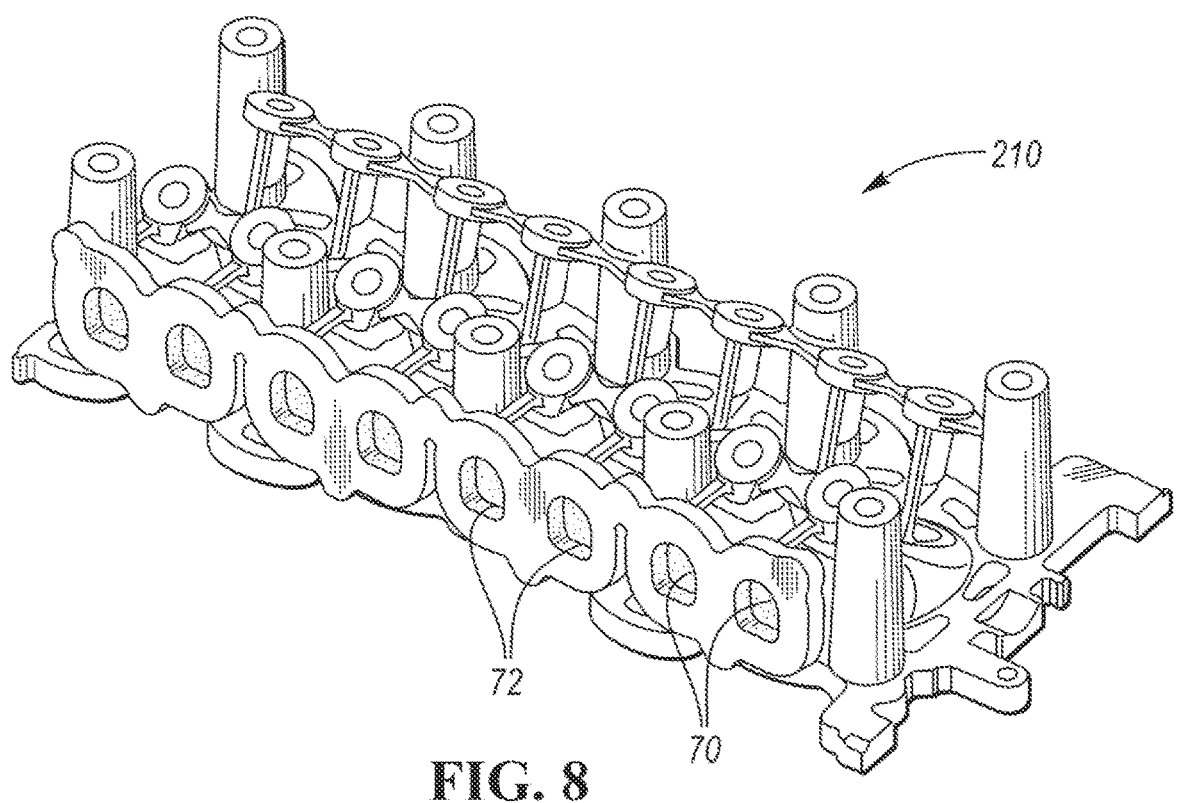
FIG. 8 shows a perspective side view of an alternative embodiment of the internal metal structure including a thermal coating.

To even further lower the mass of the hybrid cylinder head and to further improve thermal properties of the hybrid cylinder head, a thermal coating 70 may be implemented on one or more portions of the internal metal structure. In some embodiments, the thermal coating 70 may be on top of semi-compliant coating 64. An alternative example hybrid cylinder head 200 is depicted in FIGS. 7 and 8, where thermal coating 70 is depicted on a number of portions/surfaces of the internal metal structure 210. Example of an application of the thermal coating 70 can be seen in FIG. 7, which depicts a cross section of the hybrid cylinder head 200. The internal metal structure 210 includes several portions coated with the thermal coating 70. As can be seen, the thermal coating 70 is applied in the exhaust port surfaces 72 as well as the combustion chamber 74. In addition, the valve seat inserts 76 also include the thermal coating 70. In FIG. 8, the exhaust ports 72 are depicted with the thermal coating 70. In certain embodiments, the thermal coating 70 may be only on the inner surfaces of the internal metal structure 10.

The thermal coating 70 may be a thermal coating designed to limit thermal exposure of the structural components of the hybrid cylinder head 200 to extend the life of the cylinder head 200 by reducing oxidation and thermal fatigue. The thermal coating 70 is also designed to maintain heat energy in the portions of the hybrid cylinder head 200, where the heat preservation is desirable and thus prevents heat loss. The thermal coating 70 may assist with exhaust heat management. For example, the thermal coating 70 may assist with trapping heat in the exhaust ports 72 and their surfaces, as depicted in FIG. 8. Maintaining the heat in the exhaust ports 72 may result in better conversion of the exhaust species and thus overall reduction of exhaust emissions released into the atmosphere. Thus, while the thermal coating 70 may be applied anywhere within the internal metal structure 210, it is desirable to coat the portions of the internal metal structure 210 which are prone to heat exposure.

Additionally, the thermal coating 70 may enable reduction of wall thickness since the thermal coating 70 enables protection of skin surface, minimizes loading, and heat rejection. The thermal coating 70 may thus further enable mass reduction as the individual coated components of the internal metal structure 210 may be formed thinner, formed from lesser amount of material as the thermal coating 70 may compensate for the reduced thickness.

Furthermore, the thermal coating 70 may assist with keeping the heat away from the external polymer composite structure. While the thermal coating 70 has been described on the internal metal structure, it is possible to further include the thermal coating 70 or another coating on at least one or more portions of the external polymer composite structure. Application of such a coating on the polymer composite could be for example via plasma deposition such as plasma spraying.

The thermal coating 70 may be continuous or discontinuous on a portion of the internal metal structure 210. The thermal coating 70 may be conformal. The thickness of the thermal coating 70 may be uniform or differ on different portions of the internal metal structure 210. The thermal coating 70 may be smooth or at least a portion of the thermal coating 70 may be textured such as include ridges, valleys, peaks, protrusions, spikes, or the like.

In at least one embodiment, about 5, 10, 15, 20, 25, 30, 35, 40, 45, 50, 55, 60, 65, 70, 75, 80, 90, 95, or more % of the internal metal structure 210 may be coated with the thermal coating 70. For example, the entire surface of the exhaust ports 72, combustion chamber 74, or the like, may be coated.

The thermal coating 70 of the same composition may be used on different portions of the internal metal structure 210. Alternatively, two or more coatings 70 of different compositions may be implemented such that for example, a first coating's composition differs from a composition of a second coating. Besides composition, the first and second coating may differ in dimensions such as thickness, (dis)continuity, or the like. The first thermal coating 70' and the second thermal coating 70" may be temporarily or permanently in contact with each other. Additional coatings such as a third, fourth, etc. coatings are contemplated.

The thermal coating 70 may be several one ten thousandths of an inch to several thousandths of an inch thick. For example, the thickness of the thermal coating 70 may be 0.0001 to 0.01 inch, 0.0005 to 0.005, or 0.001 to 0.0025. Example materials for the thermal coating 70 may be ceramic including crystalline ceramic materials, non-crystalline ceramics, alumina, mullite comprising alumina and silica, ceria, silicon carbide, silicon nitride, tungsten carbide, titanium carbide, kaolinite, barium titanate, bismuth strontium calcium copper oxide, boron oxide, boron nitride, lead zirconate titanate, magnesium diboride, silicon aluminum oxynitride, yttrium barium copper oxide, yttrium-stabilized zirconia (YSZ), zinc oxide, zirconium dioxide, rare-earth zirconates, rear earth oxides, metal-glass composites, or a combination thereof. Other example materials for the thermal coating 70 may include molybdenum, titanium, nickel, copper, alloy such as alloys of nickel, chrome, molybdenum, high-performance superalloys such as Hastelloy®, Incoloy®, Inconel®, Stellite®, the like, or a combination.

According to embodiments of the present disclosure, a hybrid composite cylinder head includes an internal metal structure coated with a semi-compliant coating. The hybrid composite cylinder head further includes an external polymer composite structure over-molded on to the internal metal structure. The semi-compliant coating is coated on the outer surface of the internal metal structure such that thermal expansion due to different expansion rates between materials is absorbed during over-molding of the external polymer composite structure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An engine cylinder head comprising:
   an internal metal structure forming an upper portion of a combustion chamber, the internal metal structure having an outer surface, at least a portion of the outer surface being coated with a semi-compliant coating configured to absorb thermal expansion of the internal metal structure, the semi-compliant coating being an elastomer or vulcanized material; and
   a polymer composite forming an external structure over-molded onto and at least partially surrounding the internal metal structure, the external structure defining an oil intake feed, an exhaust oil feed, a cam oil feed, or a cam bearing oil feed.

2. The engine cylinder head of claim 1, wherein the semi-compliant coating has a shore hardness of 60 to 80 Shore D.

3. The engine cylinder head of claim 1, wherein the semi-compliant coating is a rubber, latex, silicon, nylon, pebax, polyethylene terephthalate, polyurethane, fluorocarbon rubber, fluoropolymer, or a blend thereof.

4. The engine cylinder head of claim 1, wherein the semi-compliant coating includes metallic powders or particles to transfer heat from the internal metal structure to a cooling system of the engine cylinder head.

5. The engine cylinder head of claim 1, wherein an entire outer surface of the internal metal structure contacting an inner surface of the external structure includes the semi-compliant coating.

6. The engine cylinder head of claim 1, wherein the semi-compliant coating has a compliance of 1,100 to 1,500 psi.

7. The engine cylinder head of claim 1, wherein the semi-compliant coating has a thickness of up to 0.5 mm.

8. An engine cylinder head comprising:
   an internal metal structure defining an outer surface;
   a semi-compliant coating disposed on an entire surface of the outer surface and configured to absorb thermal expansion of the internal metal structure; and
   an external polymer composite structure at least partially surrounding the outer surface and defining an oil intake feed, an exhaust oil feed, a cam oil feed, or a cam bearing oil feed.

9. The engine cylinder head of claim 8, wherein the semi-compliant coating is an elastomer or vulcanized material.

10. The engine cylinder head of claim 8, wherein the semi-compliant coating has a shore hardness of 60 to 80 Shore D.

11. The engine cylinder head of claim 8, wherein the semi-compliant coating has a thickness of up to 0.5 mm.

12. The engine cylinder head of claim 8, wherein the semi-compliant coating has a compliance of 1,100 to 1,500 psi.

13. An engine system comprising:
    an engine cylinder head including an internal metal structure defining an outer surface, the outer surface including a semi-compliant coating configured to absorb thermal expansion of the internal metal structure, the semi-compliant coating having a shore hardness of 60 to 80 Shore D; and
    an external polymer composite structure over-molded onto and at least partially surrounding the internal metal structure, the external polymer composite structure defining an oil intake feed, an exhaust oil feed, a cam oil feed, or a cam bearing oil feed.

14. The engine system of claim 13, wherein the semi-compliant coating has a compliance of 1,100 to 1,500 psi.

15. The engine system of claim 13, wherein the semi-compliant coating has a thickness of up to 0.5 mm.

16. The engine system of claim 13, wherein the semi-compliant coating includes metallic powders or particles to transfer heat from the internal metal structure to a cooling system of the engine cylinder head.

17. The engine system of claim 13, wherein the semi-compliant coating can withstand up to 500° F.

18. The engine system of claim 13, wherein the semi-compliant coating is an elastomer or vulcanized material.

* * * * *